United States Patent [19]

Ross

[11] 4,018,097
[45] Apr. 19, 1977

[54] AXLE LUBRICATION SYSTEM

[75] Inventor: Alan R. Ross, Lyndhurst, Ohio

[73] Assignee: Eaton Corporation, Cleveland, Ohio

[22] Filed: Jan. 7, 1976

[21] Appl. No.: 647,280

[52] U.S. Cl. .................................. 74/467; 74/713; 184/1.5; 184/6.12; 184/11 A
[51] Int. Cl.² .................... F16H 57/04; F16H 1/40; F01M 9/00; F01M 1/00
[58] Field of Search ................... 74/467, 713, 710; 184/11 A, 11 B, 6.12, 1.5

[56] References Cited
UNITED STATES PATENTS

| | | | |
|---|---|---|---|
| 2,015,108 | 9/1935 | Harper | 74/467 UX |
| 3,182,527 | 5/1965 | Bryan | 74/467 X |
| 3,444,960 | 5/1969 | Killius et al. | 74/467 X |
| 3,966,020 | 6/1976 | Quick | 74/467 X |

Primary Examiner—Leonard H. Gerin
Attorney, Agent, or Firm—Teagno & Toddy

[57] ABSTRACT

An axle lubrication system is provided utilizing an especially configured differential carrier housing adapted to be mounted to an axle housing with the axle housing oriented either upside-down or right-side-up. In either orientation, the lubrication system of the present invention provides a positive lubrication flow to the differential in either a forward or reverse direction of operation. The differential bearing support defines first and second lubricant passages and a differential carrier housing defines first and second lubricant troughs, communicating, respectively, with the first and second lubricant passages. Each of the lubricant troughs has an opening adjacent the pinion gear such that the first lubricant trough receives splash from the pinion gear, for either direction of rotation of the pinion gear, with the axle mechanism in the right-side-up position and the second lubricant trough receives the splash from the pinion gear, in either direction of rotation, with the axle mechanism in the upside-down position. Thus, the use of pick up director members is eliminated and positive lubricant flow, independent of lubricant temperature, is provided in all four modes of operation.

16 Claims, 8 Drawing Figures

AXLE LUBRICATION SYSTEM

BACKGROUND OF THE DISCLOSURE

The present invention relates to axle mechanisms, and, more particularly, to a "universal" axle lubrication system. As used herein, the term universal will be understood to mean a lubrication system which operates effectively for each of four modes of operation of the axle mechanism, to be designated hereinafter as follows:

RF — Right-Side-Up, Forward
RR — Right-Side-Up, Reverse
UF — Upside-Down, Forward
UR — Upside-Down, Reverse The invention is particularly applicable to axle mechanisms of the type employed in relatively heavy vehicles, such as on-highway and off-highway trucks, tractors, buses, etc., and will be described with reference thereto. However, it will be appreciated that the invention may have broader application and may be applied to axle mechanisms in other types of vehicles, as well as to other motion transmitting axle mechanisms.

Axle mechanisms of the type which the present invention relates typically include a housing, generally comprising a differential carrier housing and an axle housing. Disposed within the differential carrier housing is a drive pinion shaft, a pinion gear mounted on the shaft, a ring gear in meshing engagement with the pinion gear, an axle differential mounted for rotation with the ring gear, and a pair of axle shafts. In such axle mechanisms, the primary objective of the lubrication system, and of the present invention, is effective lubrication of the differential unit. When the opposite axle shafts are rotating at substantially the same speed, and in the same direction, all of the parts of the differential unit rotate substantially as a single entity, and with little or no relative movement between the parts of the differential unit, there is less concern about lubrication of the unit. However, during a "spin-out" condition, or any other condition resulting in unequal speed of the opposite axle shafts, there is relative movement between the various parts of the differential, e.g., the differential, e.g., the differential pinions and pinion shafts rotate within the differential housing, the pinions are in driving engagement with the differential side gears, and the thrust washers are loaded.

Although a spin-out condition frequently occurs for only a few seconds, such as when one of the driven wheels skids on a slippery spot on the driving surface, it also commonly occurs that a spin-out condition will be encountered over a longer period of time. Typically, this happens as the vehicle is progressing up a long grade and one of the driven wheels maintains engagement with the driving surface while the other is spinning or slipping. It will be appreciated that in this situation, if insufficient lubrication is fed to the differential unit while the parts of the differential are subjected to extreme speed differences over a long period of time, a failure is likely to occur.

Prior art axle mechanisms have utilized a number of different arrangements for lubricating the axle differential unit. For example, it has been well-known in the art to utilize openings or "windows" in the differential case, such that rotation of the case through the lubricant in the sump would permit the lubricant to enter the differential case through the windows. However, such an arrangement has been found to be generally unsatisfactory as somewhat of a "hit-or-miss" proposition, i.e., not sufficiently positive and certain to provide lubrication to all of the wear points within the differential unit.

Another common arrangement has utilized a rubber scraper or pick-up director member, typically attached to a portion of the differential carrier housing, and disposed to scrape or wipe lubricant from the O.D. of the differential case as the case rotates, passing through the sump and picking up lubricant thereon. The lubricant thus picked up by the pick-up-director member is then directed into a passageway, from where it flows into the differential unit, in the regions in which it is most needed. The use of such a pick-up-director member has been fairly common and generally satisfactory, but each such member usually functions only in one of the four operating modes of the axle mechanism. Thus, with only one such director member present, the axle mechanism is limited to one mode of use (i.e., RF, RR, UF, or UR).

In addition to limiting the modes of operation of the axle mechanism, the use of the pick-up-director members has other disadvantages. One is the manufacturing cost, as each such member represents the addition of one molded, rubber part having no other function, as well as fasteners required, typically several small bolts which necessitate a separate drilling and tapping operation on the differential housing. In operation, the pick-up-director members have been less than satisfactory for two main reasons; first, when the differential case is rotating in a direction opposite to that intended for use with the director member, the member has a tendency to engage the outer surface of the differential case and become rolled under, possibly damaging the scraper. Secondly, it should be understood that the amount of lubricant picked up on the scraper is a function of the film thickness, i.e., the thickness of the film of lubricant on the O.D. of the differential case after it passes through the sump. The film thickness is, in turn, dependent upon the temperature of the lubricant, the viscosity and film thickness of the lubricant on the differential case being greatest at ambient temperatures, while at operating temperatures (typically 180° to 220° F.), the lubricant has a lower viscosity and decreased film thickness.

Another approach to the problem, although still utilizing a pick-up-director member, is illustrated in U.S. Pat. No. 3,838,751, assigned to the Assignee of the present invention and incorporated herein by reference. In the lubrication system of the cited patent, a pick-up-director member is used, either directly or indirectly, to feed lubricant to the differential unit in both the RF and RR conditions, while in the UF and UR modes, the pinion gear rotating through the sump is utilized to direct lubricant to the differential. It was found, however, that the configuration of the differential carrier housing in the cited patent made manufacture thereof difficult, especially with regard to the necessary support for the various cores during the casting process.

SUMMARY OF THE INVENTION

Accordingly, it is an object of the present invention to provide a lubrication system for an axle mechanism which is universal, i.e., is about equally effective in each of the four basic operating modes.

It is a related object of the present invention to provide a lubrication system for an axle mechanism wherein the axle mechanism may be operated in a spin-out condition, but with a greatly minimized chance for damage to the relatively movable, load bearing parts of the differential unit.

It is another object of the present invention to provide a lubrication system capable of achieving the abovestated objects and in which the volume of lubricant fed to the differential unit is roughly proportional to the rotating speed of the pinion gear, but is relatively independent of the operating temperature of the mechanism and the lubricant contained therein.

The above and other objects of the present invention are accomplished by the provision of an improved lubrication system for an axle mechanism which may be mounted in either a right-side-up position or an upside-down position. The axle mechanism includes a housing means, a pinion gear carried by the housing means, and a ring gear in meshing engagement with the pinion gear. The pinion gear has an axis of rotation defining a horizontal plane when the axle mechanism is in either the right-side-up or upside-down position. The housing means includes a differential support means and adjacent thereto is rotatably disposed a differential, secured to the ring gear. The housing means defines a lubricant sump adapted to contain lubricant having a static level sufficient to submerge at least a portion of the pinion gear. The differential support means defines first and second lubricant passages disposed to communicate lubricant to the differential when the axle mechanism is oriented, respectively, in the right-side-up position and the upside-down position. The housing means defines a lubricant trough generally parallel to the axis of rotation of the pinion gear, the trough including a first trough portion communicating with the first lubricant passage and a second trough portion communicating with the second lubricant passage. The first trough portion receives lubricant splash from the pinion gear with the axle mechanism in the right-side-up position and the second lubricant trough receives splash from the pinion gear with the axle mechanism in the upside-down position.

In accordance with a more limited aspect of the present invention, the first trough portion is disposed below the horizontal plane when the axle mechanism is in the right-side-up position and the second trough portion is disposed below the horizontal plane when the axle mechanism is in the upside-down position. Preferably, the first and second trough portions are oppositely and approximately equally disposed about the horizontal plane.

DESCRIPTION OF THE PREFERRED EMBODIMENTS

Figure 1:
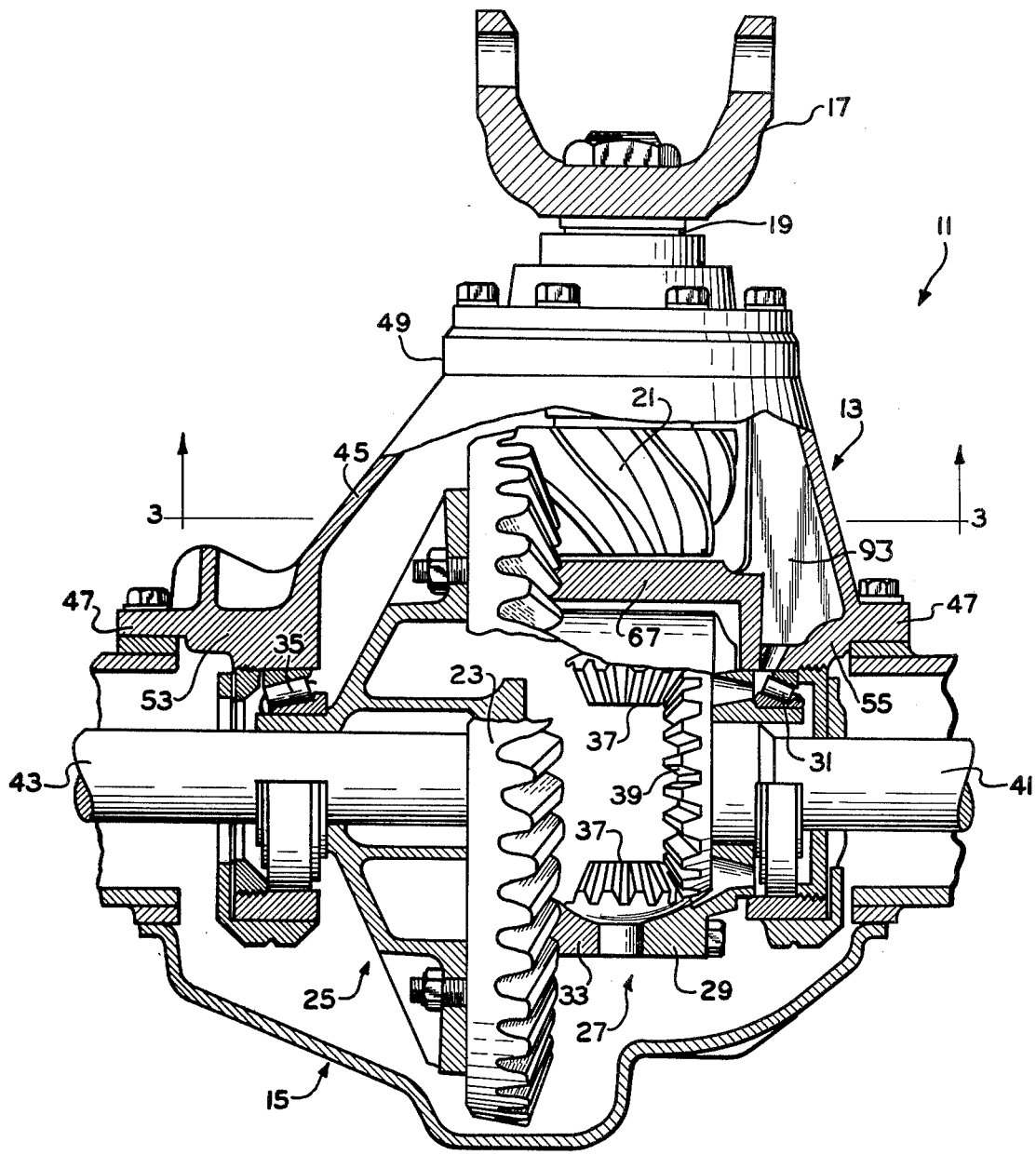
FIG. 1 is a fragmentary, top plan view of an axle mechanism of the type with which the present invention may be utilized.

Referring now to the drawings, which are intended to limit the present invention, there is shown in FIG. 1 a singlespeed axle mechanism, generally designated 11, which includes a differential carrier housing 13 adapted to be mounted to a conventional banjo-type axle housing 13. Neither the general configuration of the housings 13 and 15, nor the various other parts of the axle mechanism 11 form an essential part of the present invention, and therefore will be described only briefly herein.

The axle mechanism 11 receives an input drive, such as from a drive shaft (not shown) by means of a universal coupling 17 which, typically, is in splined engagement with a drive pinion shaft 19, having a drive pinion gear 21 mounted thereon. In meshing engagement with the pinion gear 21, and driven thereby, is a ring gear 23 (shown fragmentarily in FIG. 1). Bolted to the ring gear 23 is a differential unit, generally designated 25, including a generally cylindrical differential case 27 comprising a right-hand case half 29 journalled within differential bearings 31 and a left-hand case half 33 which carries the ring gear 23 and is journalled within differential bearings 35. The differential case 27 carries a plurality of differential pinions 37 which are in engagement with a right-hand differential side gear 39 and a left-hand differential side gear (not shown). The right-hand and left-hand differential side gears are in splined engagement, respectively, with right-hand and left-hand axle shafts 41 and 43.

Figure 2:
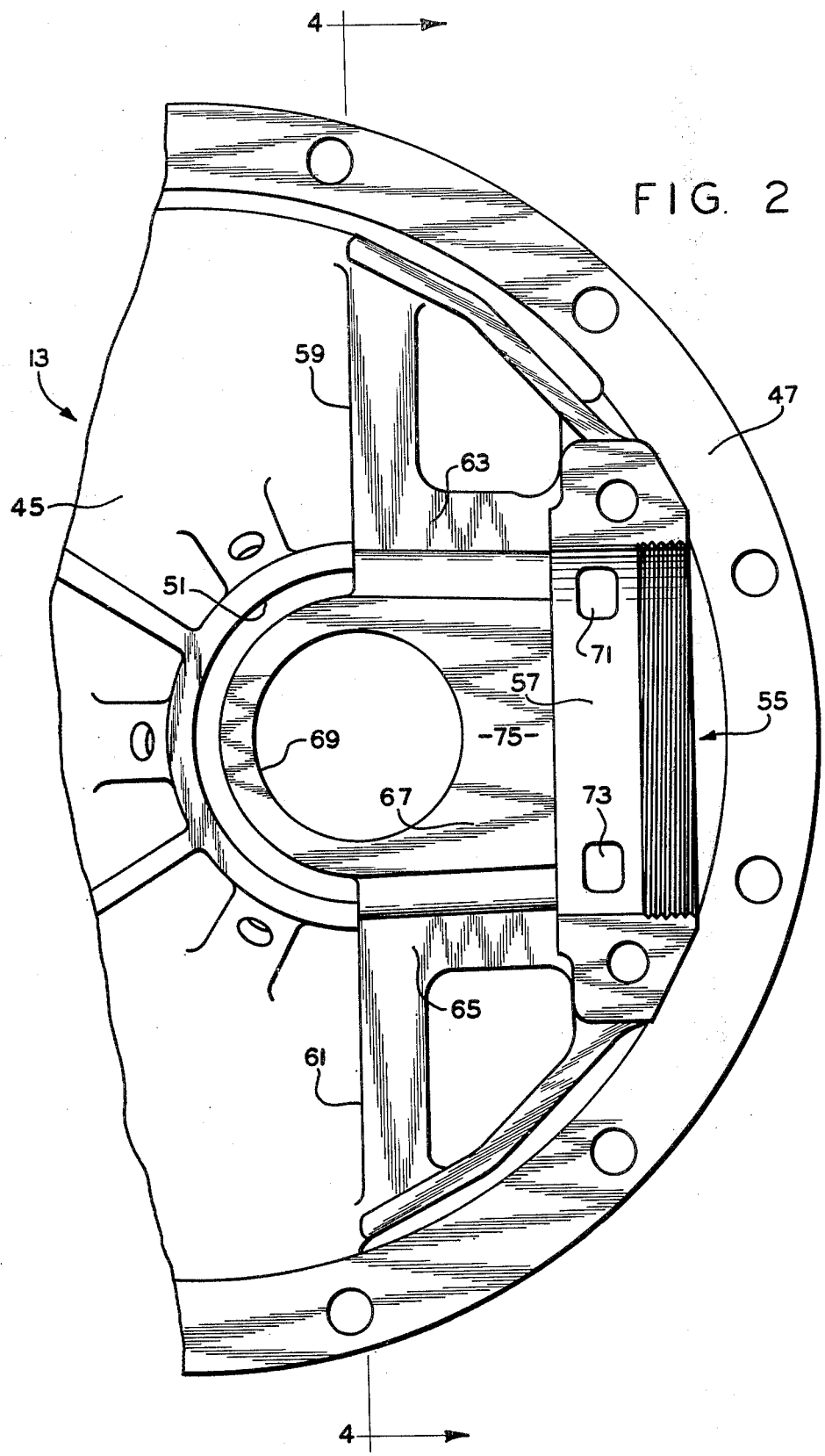
FIG. 2 is a fragmentary elevation of the rear of the differential carrier housing of the present invention.

Referring now to FIG. 2, in conjunction with FIG. 1, it may be seen that the differential carrier housing 13 includes a generally frusto-conical wall portion 45, diverging rearwardly (toward the bottom in FIG. 1), and terminating in a generally annular mounting flange 47, whereby the differential carrier housing 13 is bolted to the axle housing 15. At the opposite, forward end of the housing 13, the wall portion 45 terminates in an annular pinion bearing support portion 49 (see FIGS. 1 and 4), defining a bearing opening 51. At the rearward end of the carrier housing 13 is a left-hand differential bearing support portion 53 (shown only in FIG. 1), and a right-hand differential bearing support member 55 (see FIGS. 1, 2 and 4). The support member 55 defines a semi-circular bearing support surface 57 against which is seated the differential bearing set 31.

Figure 4:
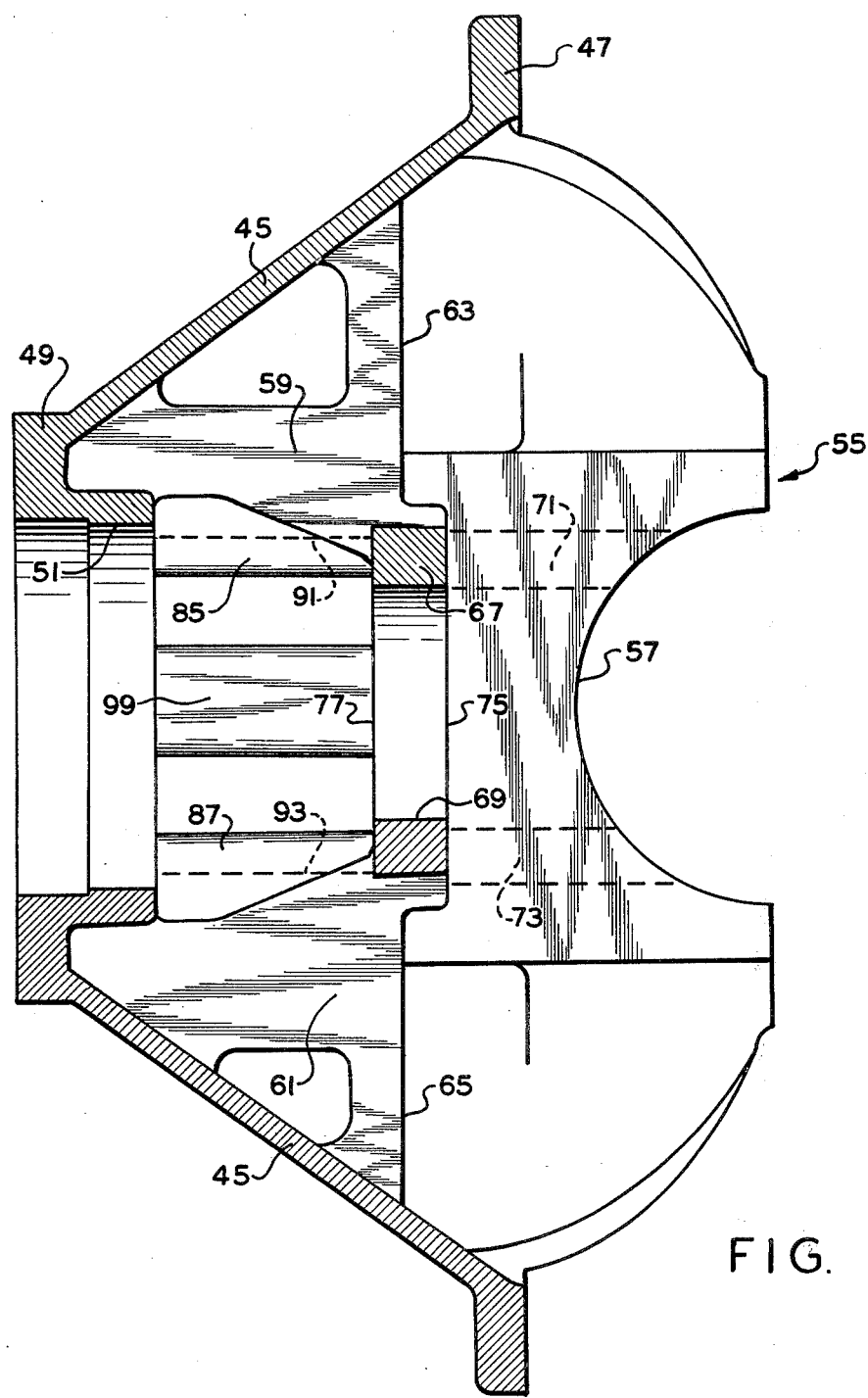
FIG. 4 is a longitudinal cross-section taken on line 4—4 of FIG. 2.

Extending inwardly and rearwardly from the wall portion 45 are upper and lower longitudinally-extending support walls 59 and 61 (see FIG. 4). Extending transversely from frusto-conical wall portion 45 are upper and lower transversely-extending support walls 63 and 65 (see FIG. 2). Extending transversely from the differential bearing support member 55 is a middle wall portion 67 defining a pilot bearing opening 69, on a common axis with the pinion bearing opening 51. The middle wall portion 67 is supported, at its upper extremity, by support walls 59 and 63, and at its lower extremity, by support walls 61 and 65.

Referring now primarily to FIGS. 2 and 4, the right-hand differential bearing support member 55 includes a pair of cored lubricant passages 71 and 73, passage 73 opening into a region adjacent the bottom of the differential unit 25 when the axle mechanism is in the rightside-up position of FIG. 4, while passage 71 communicates lubricant to a region adjacent the bottom of the differential unit when the axle mechanism is in the upside-down position (turned 180° from the position in FIG. 4).

The middle wall portion 67 has a rear wall surface 75 and a forward wall surface 77. As may be seen by viewing FIG. 3 in conjunction with FIG. 4, the differential carrier housing 13 of the present invention is especially configured to provide lubricant troughs which feed lubricant passages 71 and 73, depending upon the orientation of the axle housing. Extending generally inwardly from the frusto-conical wall portion 45 are trough walls 81 and 83 (see FIG. 3), trough wall 81 having an angled wall 85 contiguous therewith, and trough wall 83 having an angled wall 87 contiguous therewith. With the axle mechanism in the right-side-up position as shown, the walls 83 and 87 cooperate with wall portion 45 to define a lubricant trough $T_1$ (see FIG. 3), which is shown containing lubricant and which is in open fluid communication with lubricant passage 73. When the axle mechanism is in the upside-down position, the walls 81 and 85 cooperate with wall portion 45 to define a lubricant trough $T_2$ which, in the upside-down position, is capable of containing lubricant and communicating it to lubricant passage 71.

Figure 3:
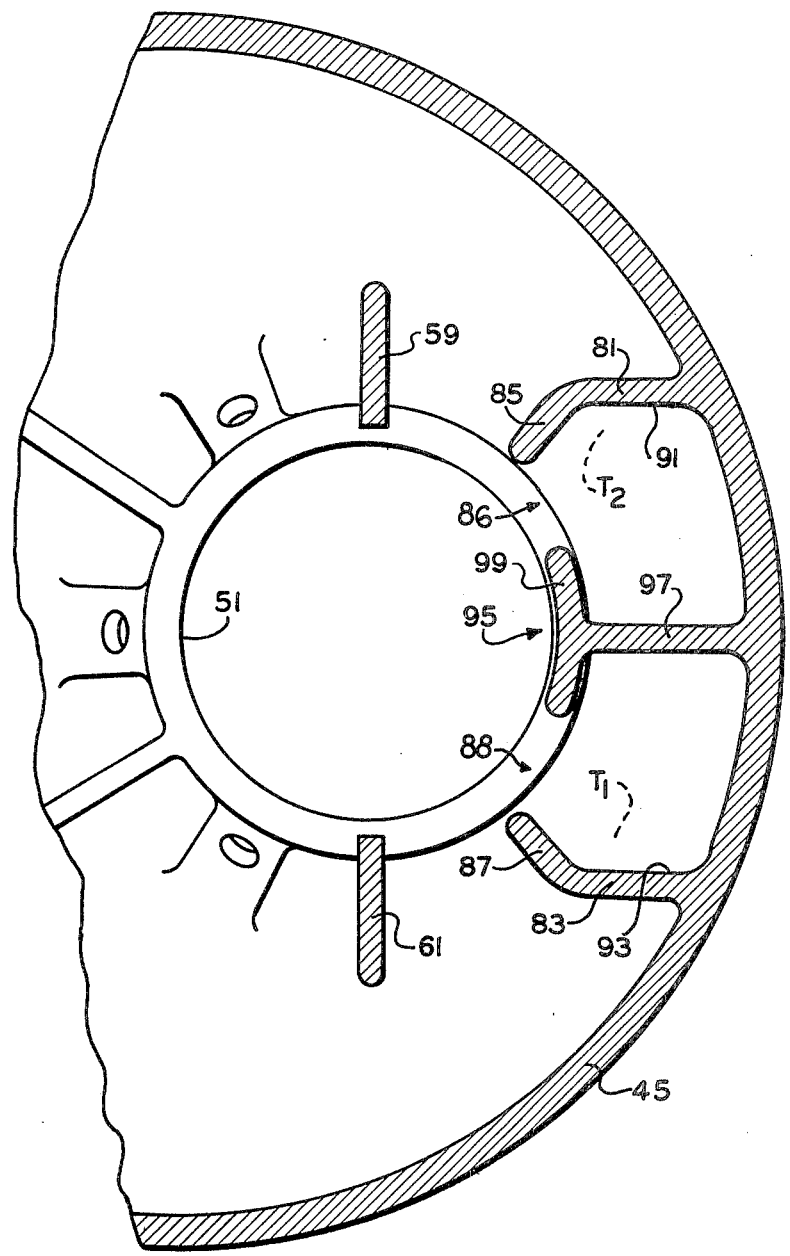
FIG. 3 is a cross-section taken on line 3—3 of FIG. 1, but showing only the differential carrier housing.

When the axle mechanism is in the right-side-up position, as in FIGS. 3 and 4, the lubricant trough $T_1$ has a bottom, trough surface 93 and it may be seen in FIg. 4 that the trough surface 93 is preferably at about the same level as the bottom of the lubricant passage 73, although they may be offset slightly. Similarly, with the axle mechanism in the upside-down position, the lubricant trough $T_2$ has a bottom, trough surface 91 at about the same level as the bottom of lubricant passage 71. Lubricant enters the lubricant trough $T_1$ through an opening or window 88 defined by the upper extremity or lip of angled wall 87 and the lower edge of vertical wall portion 99. Similarly, with the axle mechanism in the upside-down position, lubricant enters lubricant trough $T_2$ through an opening or window 86 defined by the upper lip of angled wall 85 and the lower edge of vertical wall portion 99.

Disposed between the trough walls 81 and 83 is a generally T-shaped support wall 95 including a horizontal wall portion 97 and a slightly curved, vertical wall portion 99. It will be appreciated by those skilled in the art that support wall 95 serves no function in connection with the lubrication system of the present invention and, in the subject embodiment, has been included only for purposes of support.

Figure 5A:
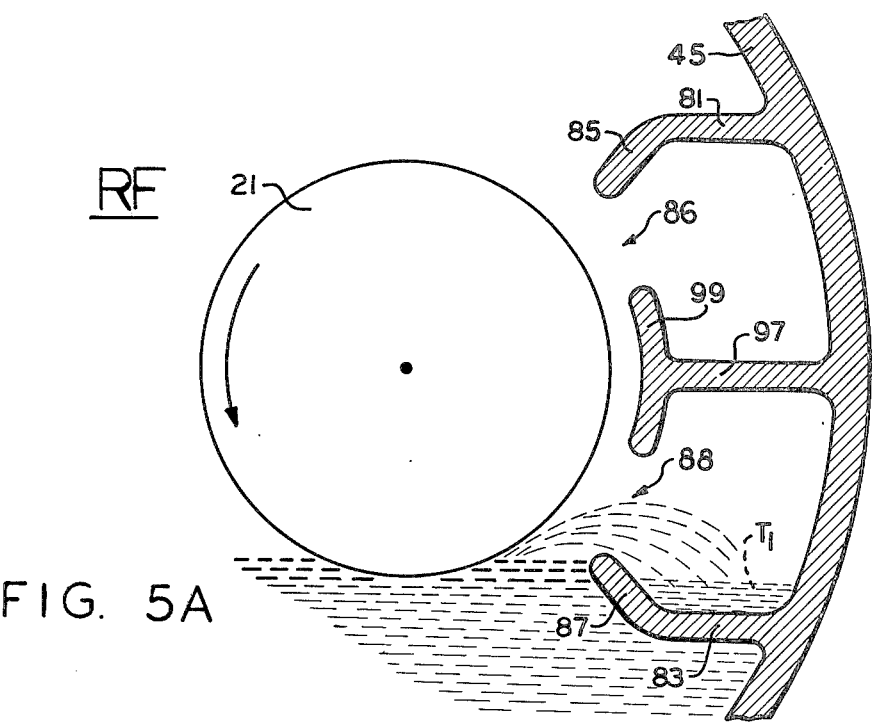
FIGS. 5A and 5B are partly schematic views, similar to FIG. 3, illustrating the operation of the lubrication system of the present invention.
Figure 5B:
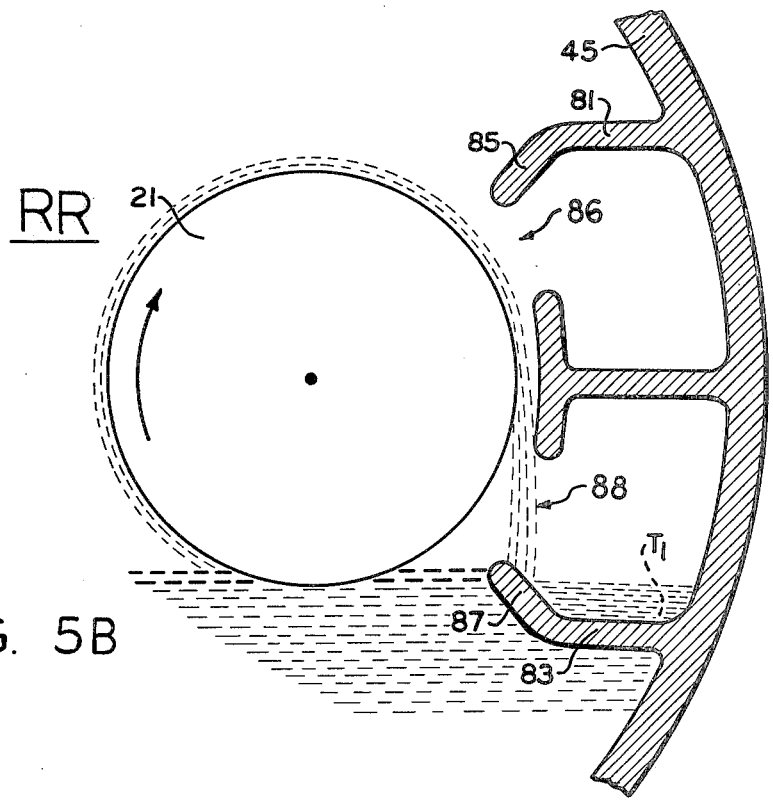

Referring now to FIGS. 5A and 5B, the operation of the lubrication system of the present invention is illustrated schematically. Both FIGS. 5A and 5B show the axle mechanism in the right-side-up position as shown in FIGS. 1 through 4, but it will be understood that, because the lubricant troughs $T_1$ and $T_2$ are oppositely and approximately equally disposed about an imaginary horizontal plane containing the axis of rotation of the pinion gear 21, the lubrication system operates in the same manner with the axle mechanism in the upside-down position. FIG. 5A illustrates the right-side-up, forward (RF) mode of operation with the pinion gear rotating in the counterclockwise direction to pick lubricant up from the sump and splash it through the window 88 into lubricant trough $T_1$ as shown. In FIG. 5B, with the mechanism in the right-side-up, reverse (RR) operating mode, the pinion gear 21 is rotating in the clockwise direction to pick lubricant up from the sump and splash the lubricant through window 88 into lubricant trough $T_1$, as shown.

The schematic illustrations of FIGS. 5A and 5B show the importance of angled walls 85 and 87, as well as the importance of the angle at which walls 85 and 87 are oriented. It will be appreciated that if angled wall 87 is oriented at too shallow an angle relative to the horizontal, the maximum lubricant level in trough $T_1$ will be insufficient to insure a proper flow of lubricant through lubricant passage 73 and into the differential. On the other hand, if the included angle between angled wall 87 and the horizontal is too great, it will be difficult to splash sufficient lubricant over wall 87 into the trough (as in FIG. 5A), and angled wall 87 will not extend far enough out beyond vertical wall 99 to catch sufficient lubricant splash (as in FIG. 5B). The latter point is especially significant in the case where, for purposes of support, the T-shaped support wall 95 is required. In the subject embodiment, it has been found desirable to orient the angled walls 85 and 87 at approximately 45° to the trough surfaces 91 and 93, respectively. Furthermore, in the preferred embodiment, the angled walls 85 and 87 extend in a direction generally toward the axis of rotation of pinion gear 21, and as may be seen in FIGS. 5A and 5B, the angled wall 87 extends far enough toward the axis of pinion gear 21 that the upper extremity or upper lip of the wall 87 is at least slightly above the normal, static lubricant level.

Figure 6:
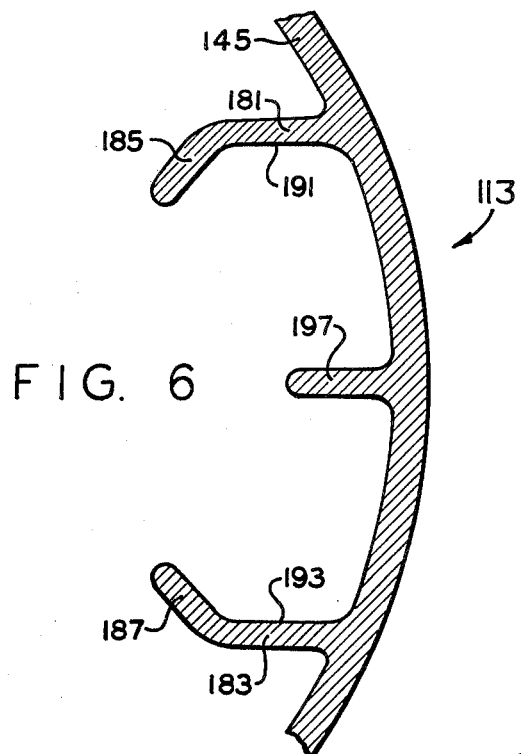
FIG. 6 is a cross-section, similar to FIG. 3, illustrating an alternative embodiment of the present invention.
Figure 7:
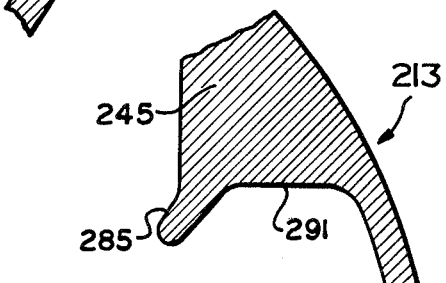
FIG. 7 is a cross-section, similar to FIGS. 3 and 6, illustrating another alternative embodiment of the invention.
Figure 7:
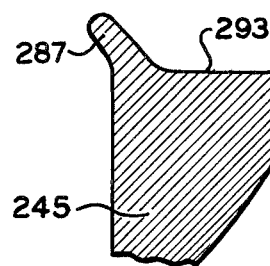

Referring now to FIGS. 6 and 7, there are shown two alternative embodiments of the present invention, in which like elements bear like numerals, plus 100 in FIG. 6 and plus 200 in FIG. 7. In FIG. 6 the differential carrier housing 113 is identical to that shown in FIGS. 1 through 4, except that the T-shaped support wall 95 shown in FIG. 3 has been eliminated in the FIG. 6 embodiment. Instead, there is disposed between trough walls 181 and 183 a relatively shorter horizontal wall portion 197, also included primarily for purposes of support.

In the embodiment of FIG. 7, there are provided lubricant troughs $T_1$ and $T_2$ having substantially the same configuration as in the previously-described embodiments. However, the individual trough walls 81 and 83 have been eliminated and instead, solid wall portions 245 have been utilized, terminating in angled walls 285 and 287, the solid wall portions 245 providing greater overall strength and rigidity in the differential carrier housing 213. It will be appreciated by those skilled in the art that various other configurations of walls may be utilized to provide the lubricant troughs $T_1$ and $T_2$, and it is within the scope of the present invention to utilize such other wall and trough configurations as are within the scope of the appended claims.

I claim:
1. An axle mechanism operable to be mounted in either a right-side-up or an upside-down position and receive a rotating input drive, said axle mechanism comprising:
   a. an axle housing;
   b. a differential carrier housing adapted to be mounted on said axle housing and defining a differential bearing support;
   c. a pinion gear driven by the input drive and carried by said differential carrier housing;
   d. a ring gear in meshing engagement with said pinion gear;

e. a differential secured to said ring gear and rotatably disposed adjacent said differential bearing support;

f. a lubricant sump within said differential carrier housing, said lubricant sump having a static level sufficient to submerge at least a portion of said pinion gear;

g. said differential bearing support defining first and second lubricant passages, said first lubricant passage disposed to communicate lubricant flow to said differential when said axle mechanism is in the right-side-up position and said second lubricant passage disposed to communicate lubricant flow to said differential when said axle mechanism is in the upside-down position;

h. said differential carrier housing defining a first lubricant trough having a first opening, said first trough and said first opening being oriented generally parallel to the axis of rotation of said pinion gear, said first opening being disposed adjacent said pinion gear to receive lubricant splash from said pinion gear as said pinion gear rotates through said lubricant sump with said axle mechanism in said right-side-up position;

i. said differential carrier housing defining a second lubricant trough having a second opening, said second trough and said second opening being oriented generally parallel to the axis of rotation of said pinion gear, said second opening being disposed adjacent said pinion gear to receive lubricant splash from said pinion gear as said pinion gear rotates through said lubricant sump with said axle mechanism in said upside-down position; and j. said first and second lubricant troughs being in open communication with said first and second lubricant passages, respectively.

2. An axle mechanism as claimed in claim 1 wherein the axis of rotation of said pinion gear defined a generally horizontal plane when said axle mechanism is in one of the right-side-up and upside-down positions, said first lubricant trough and said first opening being disposed below said horizontal plane when said axle mechanism is in the right-side-up position and said second lubricant trough and said second opening being disposed below said horizontal plane when said axle mechanism is in the upside-down position.

3. An axle mechanism as claimed in claim 2 wherein said first and second lubricant troughs and said first and second openings are oppositely and approximately equally disposed about said horizontal plane.

4. An axle mechanism as claimed in claim 1 wherein said first and second lubricant passages are disposed oppositely and approximately equally about said horizontal plane.

5. An axle mechanism as claimed in claim 1 wherein said first lubricant trough and said first opening are disposed to receive lubricant splash from said pinion gear as said pinion gear rotates through said lubricant sump, both in a forward direction and in a reverse direction, with said axle mechanism in said right-side-up position.

6. An axle mechanism as claimed in claim 1 wherein said second lubricant trough and said second opening are disposed to receive lubricant splash from said pinion gear as said pinion gear rotates through said lubricant sump, both in a forward direction and in a reverse direction, with said axle mechanism in said upside-down position.

7. An axle mechanism as claimed in claim 1 wherein said first lubricant trough is at a higher fluid level than said first lubricant passage when said axle mechanism is in the right-side-up position.

8. An axle mechanism as claimed in claim 1 wherein said second lubricant trough is at a higher fluid level than said second lubricant passage when said axle mechanism is in the upside-down position.

9. An axle mechanism operable to be mounted in either a right-side-up position or an upside-down position and receive a rotating input drive, said axle mechanism comprising:

a. housing means;

b. a pinion gear driven by the input drive and carried by said housing means, said pinion gear having an axis of rotation defining a plane oriented generally horizontal when said axle mechanism is in one of the right-side-up and upside-down positions;

c. a ring gear in meshing engagement with said pinion gear;

d. said housing means including differential support means;

e. a differentail secured to said ring gear and rotatably disposed adjacent said differential support means;

f. said housing means defining a lubricant sump adapted to contain lubricant having a static level sufficient to submerge at least a portion of said pinion gear;

g. said differential support means defining first and second lubricant passages, said first lubricant passage disposed to communicate lubricant flow to said differential when said axle mechanism is in the right-side-up position and said second lubricant passage disposed to communicate lubricant flow to said differential when said axle mechanism is in the upside-down position;

h. said housing means including means defining a lubricant trough oriented generally parallel to the axis of rotation of said pinion gear;

i. said lubricant trough including a first trough portion in open communication with said first lubricant passage and disposed to receive lubricant splash from said pinion gear as the pinion gear rotates through the lubricant in said lubricant sump, with said axle mechanism in the right-side-up position;

j. said lubricant trough including a second trough portion in open communication with said second lubricant passage and disposed to receive lubricant splash from said pinion gear as said pinion gear rotates through the lubricant in said lubricant sump, with said axle mechanism in the upside-down position.

10. An axle mechanism as claimed in claim 9 wherein said first trough portion includes a first trough surface oriented generally parallel to said horizontal plane and being disposed at a higher fluid level than said first lubricant passage when said axle mechanism is in the right-side-up position.

11. An axle mechanism as claimed in claim 9 wherein said second trough portion includes a second trough surface oriented generally parallel to said horizontal plane and at a higher fluid level than said second lubricant passage when said axle mechanism is in the upside-down position.

12. An axle mechanism as claimed in claim 10 wherein said first trough portion includes a first wall portion contiguous with said first trough surface and extending therefrom generally toward the axis of rotation of said pinion gear, said first wall portion terminating in a first lip disposed above said static lubricant level when said axle mechanism is in the right-side-up position.

13. An axle mechanism as claimed in claim 11 wherein said second trough portion includes a second wall contiguous with said second trough surface and extending therefrom generally toward the axis of rotation of said pinion gear, said second wall terminating in a second lip disposed above said static lubricant level when said axle mechanism is in the upside-down position.

14. An axle mechanism as claimed in claim 9 wherein said first lubricant passage is dispoed to communicate lubricant to a region adjacent the bottom of said differential when said axle mechanism is in the right-side-up position.

15. An axle mechanism as claimed in claim 9 wherein said second lubricant passage is disposed to communicate lubricant to a region adjacent the bottom of said differential when said axle mechanism is in the upside-down position.

16. An axle mechanism as claimed in claim 9 wherein said first and second trough portions are oppositely and approximately equally disposed about said horizontal plane.

* * * * *

UNITED STATES PATENT AND TRADEMARK OFFICE
CERTIFICATE OF CORRECTION

PATENT NO. : 4,018,097
DATED : April 19, 1977
INVENTOR(S) : Alan R. Ross

It is certified that error appears in the above–identified patent and that said Letters Patent are hereby corrected as shown below:

Col. 4, line 7:     "not" before "intended" has been omitted.

line 12:    "13" should read "15".

Col. 7, line 38:    "defined" should read "defines".

Col. 8, line 23:    "differential" has been misspelled.

*Signed and Sealed this*

*fifth* Day of *July 1977*

[SEAL]

Attest:

RUTH C. MASON
*Attesting Officer*

C. MARSHALL DANN
*Commissioner of Patents and Trademarks*